US005667450A

United States Patent [19]

Leini

[11] Patent Number: 5,667,450

[45] Date of Patent: Sep. 16, 1997

[54] DRIVE SPROCKET DEVICE

[75] Inventor: Arvo Leini, Edsbyn, Sweden

[73] Assignee: Sandvik AB, Sweden

[21] Appl. No.: 489,582

[22] Filed: Jun. 12, 1995

[30] Foreign Application Priority Data

Jun. 13, 1994 [SE] Sweden ............................... 9402038-5

[51] Int. Cl.[6] ........................................................ F16H 7/06

[52] U.S. Cl. ............................. 474/157; 474/158; 30/381

[58] Field of Search .............................. 474/92, 152, 153, 474/156–158; 30/381

[56] References Cited

U.S. PATENT DOCUMENTS 3,410,147 11/1968 Scott-Jackson ...................... 474/158 X
3,519,037 7/1970 Linkfield ............................. 474/158 X
3,669,162 6/1972 Irgens ................................... 74/438 X
3,857,179 12/1974 Haudt et al. ........................ 474/158 X
5,098,348 3/1992 Oneel ........................................ 474/157
5,303,477 4/1994 Kuzarov ............................ 474/164 X

FOREIGN PATENT DOCUMENTS

WO95/06549 3/1995 WIPO .

*Primary Examiner*—Roger J. Schoeppel

[57] ABSTRACT

A saw chain of a chain saw is driven by a drive sprocket assembly including a drive sprocket and a pair of separate drive rings arranged coaxially and rotatably on the drive sprocket. Drive links of the saw chain extend through an annular space formed between the drive rings and enter recesses formed in the drive sprocket to be driven thereby.

4 Claims, 2 Drawing Sheets

DRIVE SPROCKET DEVICE

BACKGROUND OF THE INVENTION

The invention relates to a drive mechanism for a saw chain of a chain saw.

In Swedish Patent Application 9302842-1 there is shown a device for automatically tensioning the saw chain of a chain saw, wherein the chain runs around a loose outer drive ring which is rolling on a drive sprocket of a traditional rim type. The drive ring has an annular row of circumferentially spaced orifices, through which the drive links of the saw chain enter an annular row of circumferentially spaced recesses in the periphery of the drive sprocket. Axial displacement between the drive ring and the drive sprocket are prevented by stop flanges.

To obtain a large enough contact surface between the drive links and the recesses, the drive ring must be made thin, which makes the bridges between the orifices of the drive ring vulnerable and difficult to manufacture. Even with a thin drive ring, there is a tendency that the contact surface of the recess which contacts the leading edge of the drive links becomes too small, which makes the links climb the drive sprocket in a forward direction if the rotational velocity is non-uniform, as is often the case with high speed piston engines. Moreover, if the bridges between the orifices of the drive ring are damaged the drive ring will split and may cause chain damage or other malfunction.

SUMMARY OF THE INVENTION

The present invention relates to a drive apparatus for a chain saw, comprising a drive sprocket rotatable about an axis and including circumferentially spaced radial ridges having outer peripheral surfaces lying on a first diameter that is coplanar with the axis. A drive ring assembly is provided which comprises a pair of separate drive rings loosely mounted for rotation on the drive sprocket coaxial with the axis. The drive rings include respective circumferentially extending portions spaced apart by a first axial distance to form an annular space therebetween. Each circumferentially extending portion has radially spaced outer and inner surfaces. A saw chain extends around the outer surface of the drive rings and includes drive links extending radially inwardly through the annular space formed between the drive rings. First and second stop surfaces are spaced apart in the axial direction by a second axial distance to form an axial space in which the first and second drive rings are disposed. The stop surfaces are axially fixed and limit the maximum axial separation between the first and second drive rings to a distance slightly larger than the thickness of the drive links.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 2:
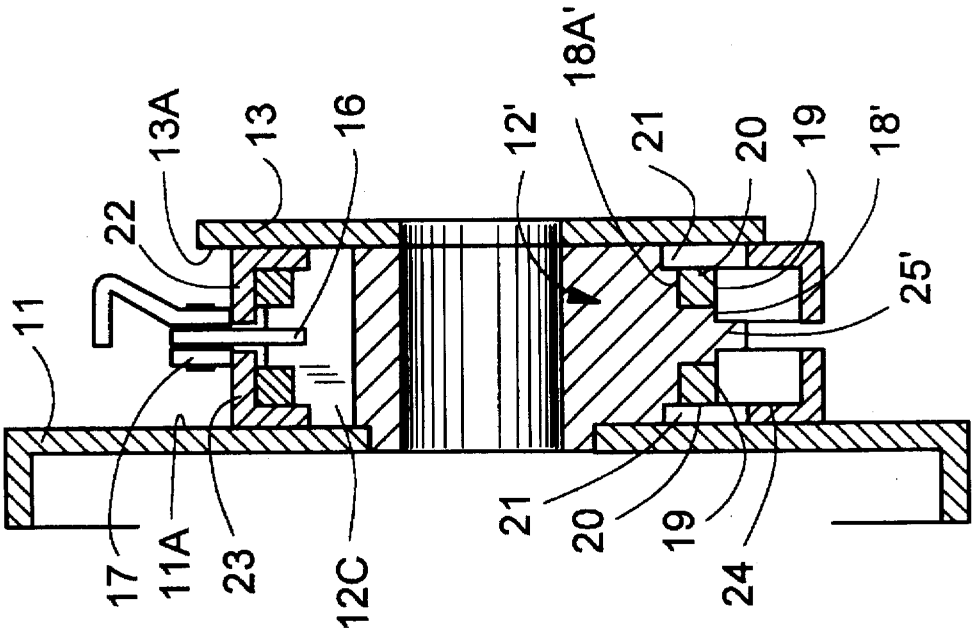
FIG. 2 is a sectional view taken along line 2—2 in FIG. 4 through a second embodiment of a drive sprocket arrangement according to the invention.
Figure 1:
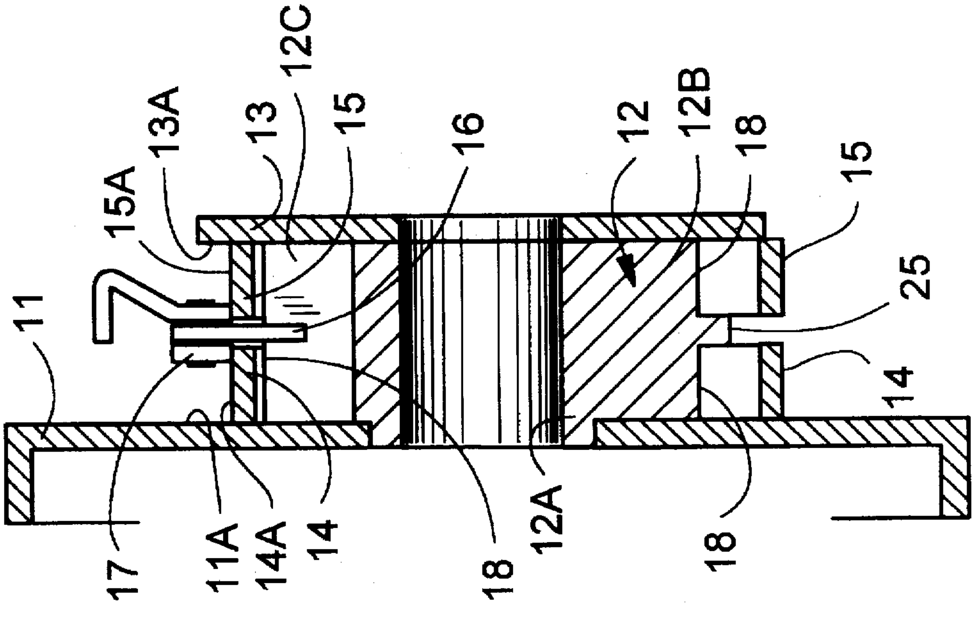
FIG. 1 is a sectional view taken through a first embodiment of a drive sprocket arrangement according to the invention.

The invention is described with reference to FIGS. 1 and 2, showing cross sections through two respective embodiments, at the motor end of the chain saw, where the chain is supported by the drive rings. FIG. 1 shows an embodiment for use mainly with saws having a horizontal drive shaft. A clutch drum 11 is fastened to a first end of a tubular drive sprocket part 12 which includes a cylindrical base 12A and radial ridges 12B on the outside of the base, which sprocket is also known as a spur sprocket. Circumferentially spaced recesses 12C are formed between adjacent ridges 12B. Upon the ridges 12B two drive rings 14, 15 are freely rolling, which drive rings take the place of a conventional one-piece drive ring. The ridges 12B may have a uniform height throughout their length, or preferably have a higher center 25 with lower supporting shoulders 18 for supporting the rings 14, 15, which allows for a smoother rolling motion. The inner diameter of the rings 14, 15 is larger than the diameter defined by the supporting portions 18. At the second end of the tubular sprocket part 12 there is a washer 13, preferably held in axially fixed relationship to the end of the drive shaft by an elastic retaining ring (not shown). The washer 13 forms a radial stop surface 13A which, together with a radial stop surface 11A formed by the clutch drum 11, forms an axial space in which the drive links 14, 15 are disposed. Drive links of the saw chain project into a space formed between two axially spaced circumferentially extending portions 14A, 15A, respectively of the drive rings 14, 15. The width of the rings 14, 15 is such that they can roll freely on the supporting portions 18 without jamming between the drive links 16, the drum 11 and the washer 13, while still supporting the side links 17 of the chain in a radial direction. If it is desirable to increase the stiffness of the rings, they may be provided with flanges disposed adjacent to the drum 11 and the washer 13.

Figure 4:
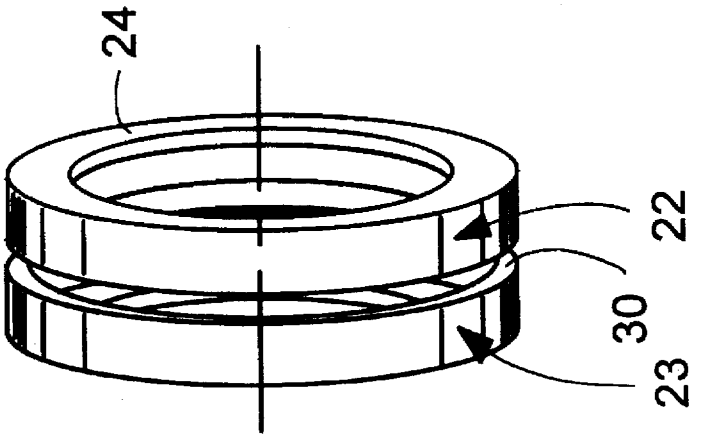
FIG. 4 is a perspective view of the drive sprocket arrangement depicted in FIG. 2, with the saw chain omitted.
Figure 3:
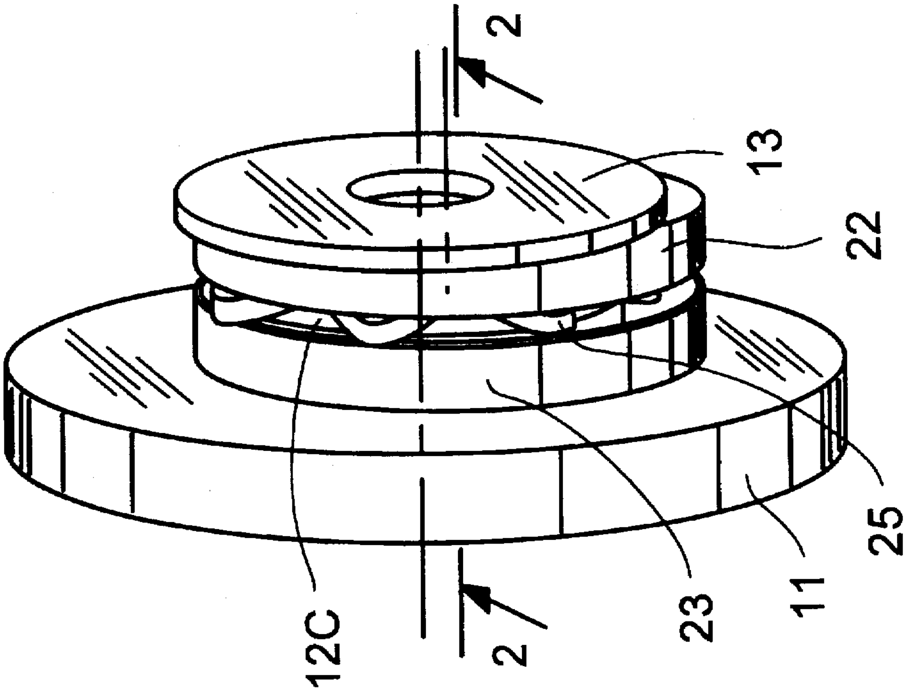
FIG. 3 is a perspective view of two drive rings of the embodiment depicted in FIG. 2.

For chain saws operating with a vertical shaft, FIGS. 2–4 show an embodiment, where the supporting portions 18' have been joined by fixed circular support rings 20 fastened to the sprocket part 12' while supported by lower or stepped-down portions 18A' of the ridges. The outside surfaces of the fixed supports rings serve as continuous cylindrical rolling surfaces 19 for the drive rings 22, 23 which, like the drive rings 14, 15 of FIG. 1 are freely rolling. The drive rings 22, 23 include circumferentially extending portions 22A, 23A, respectively, that are spaced apart to form a space 30 therebetween into which the drive links 16 of the saw chain project, whereby the drive links can enter the recesses 12C formed between adjacent ones of the ridges 12B. Axial displacement of the drive rings 22, 23 can be further restrained by radially inwardly directed flanges 24 guided in grooves 21 disposed adjacent to the fixed rings, to keep the drive rings parallel to each other and maintain an axial spacing between the rings to accomodate the drive links 16 even when the chain has not started moving and is not tensioned.

The invention is not restricted to the embodiments shown in the figures. The drive rings need not be identical to each other, and may have combinations of outward and inward flanges. Fixed stop members may be used without adjacent grooves and flanges on the drive rings. The drive ring edges facing the drive links can preferably be slightly rounded or tapered to facilitate entry of the drive links. If no clutch drum 11 is needed, another washer may serve to restrain the drive rings from being displaced towards the first end of the tubular sprocket part 12.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A drive apparatus for a chain saw, comprising:

a drive sprocket rotatable about an axis of rotation and including an outer surface of a first diameter which includes circumferentially spaced recesses;

a drive ring assembly comprising a pair of separate drive rings loosely mounted for rotation on said drive sprocket, each drive ring being circular and extending endlessly in a circumferential direction, said drive rings including respective circumferentially extending portions spaced apart by a first axial distance to form an annular space therebetween, each circumferentially extending portion having radially spaced outer and inner surfaces, said inner surface having a second diameter larger than said first diameter, whereby a center axis of each drive ring is offset from the axis of rotation of the drive sprocket;

a saw chain extending around said outer surfaces of said drive rings and including drive links extending radially inwardly through said annular space; and first and second radial stop surfaces spaced apart in a direction parallel to said axis of rotation by a second axial distance to form an axial space in which said first and second drive rings are disposed, said stop surfaces being fixed in axially spaced relationship for limiting a maximum axial separation between said first and second drive rings to a distance slightly larger than a thickness of said drive links.

2. The apparatus according to claim 1, wherein each drive ring includes a radially inwardly directed flange, said drive sprocket including radial surfaces each engageable with a flange of a respective drive ring for limiting the extent to which the drive rings can axially approach one another.

3. The apparatus according to claim 1, wherein said outer surface of said drive sprocket is formed by circumferentially spaced, radially projecting ridges, said drive rings supported on said outer surfaces of said ridges.

4. The apparatus according to claim 1, wherein said outer surface of said drive sprocket is formed by circumferentially spaced, radially projecting ridges, said ridges include grooves in which annular support rings are disposed, said drive rings being supported on said support rings.

* * * * *